United States Patent
Adachi et al.

(10) Patent No.: US 6,318,161 B1
(45) Date of Patent: Nov. 20, 2001

(54) INTERNAL COMBUSTION ENGINE DIAGNOSTIC APPARATUS

(75) Inventors: Shin Adachi, Toyota; Hidetoshi Amano, Okazaki, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/561,624

(22) Filed: May 2, 2000

(30) Foreign Application Priority Data

May 11, 1999 (JP) .................................................. 11-129793

(51) Int. Cl.[7] .................................................. G01M 15/00
(52) U.S. Cl. .................................................. 73/116
(58) Field of Search .................................. 73/116, 117.2, 73/117.3, 118.1

(56) References Cited

U.S. PATENT DOCUMENTS

| | | | |
|---|---|---|---|
| 4,965,549 | * | 10/1990 | Koike . |
| 5,513,522 | * | 5/1996 | Seki et al. ............................ 73/118.1 |
| 5,672,817 | * | 9/1997 | Sagisaka et al. .................... 73/118.1 |
| 5,848,381 | * | 12/1998 | Ishii et al. ............................... 73/766 |
| 6,112,150 | * | 8/2000 | Irons et al. . |
| 6,260,411 | * | 7/2001 | Esteghlal et al. ................... 73/118.1 |

FOREIGN PATENT DOCUMENTS

HEI 8-75612    9/1994   (JP) .

* cited by examiner

*Primary Examiner*—Eric S. McCall
(74) *Attorney, Agent, or Firm*—Kenyon & Kenyon

(57) ABSTRACT

In a diagnostic apparatus for an internal combustion engine, an electronic control unit recognizes occurrence of a misfire in the engine based on fluctuations of the rotational speed of a crankshaft detected by a rotation speed sensor. Based on the detected incidences of misfire, the electronic control unit performs diagnostics. The electronic control unit turns on a warning light when, after the first diagnosis of the presence of an abnormality, a second diagnosis of the presence of an abnormality is made without the return of the engine to the normal state being recognized after a restart of the engine.

10 Claims, 6 Drawing Sheets

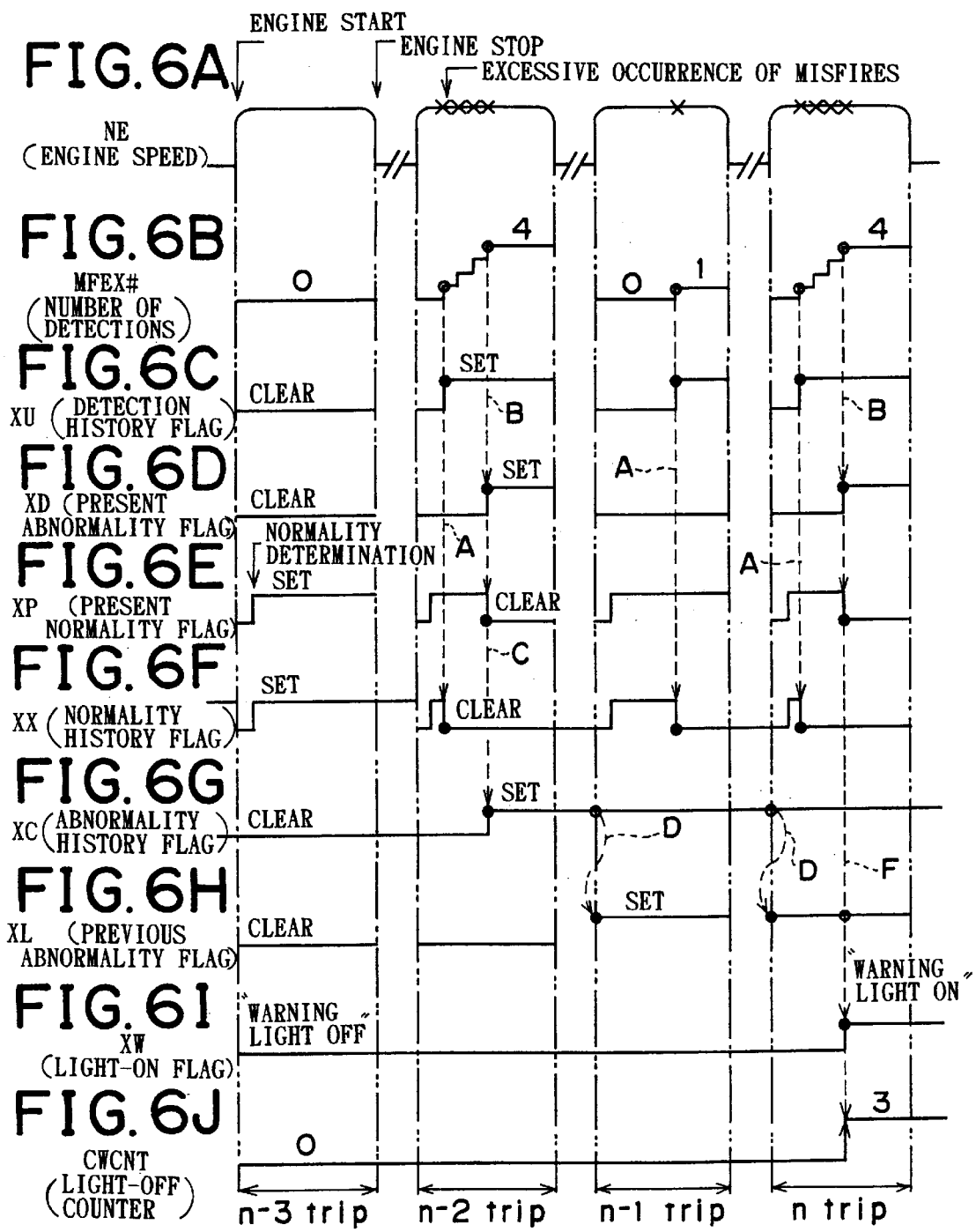

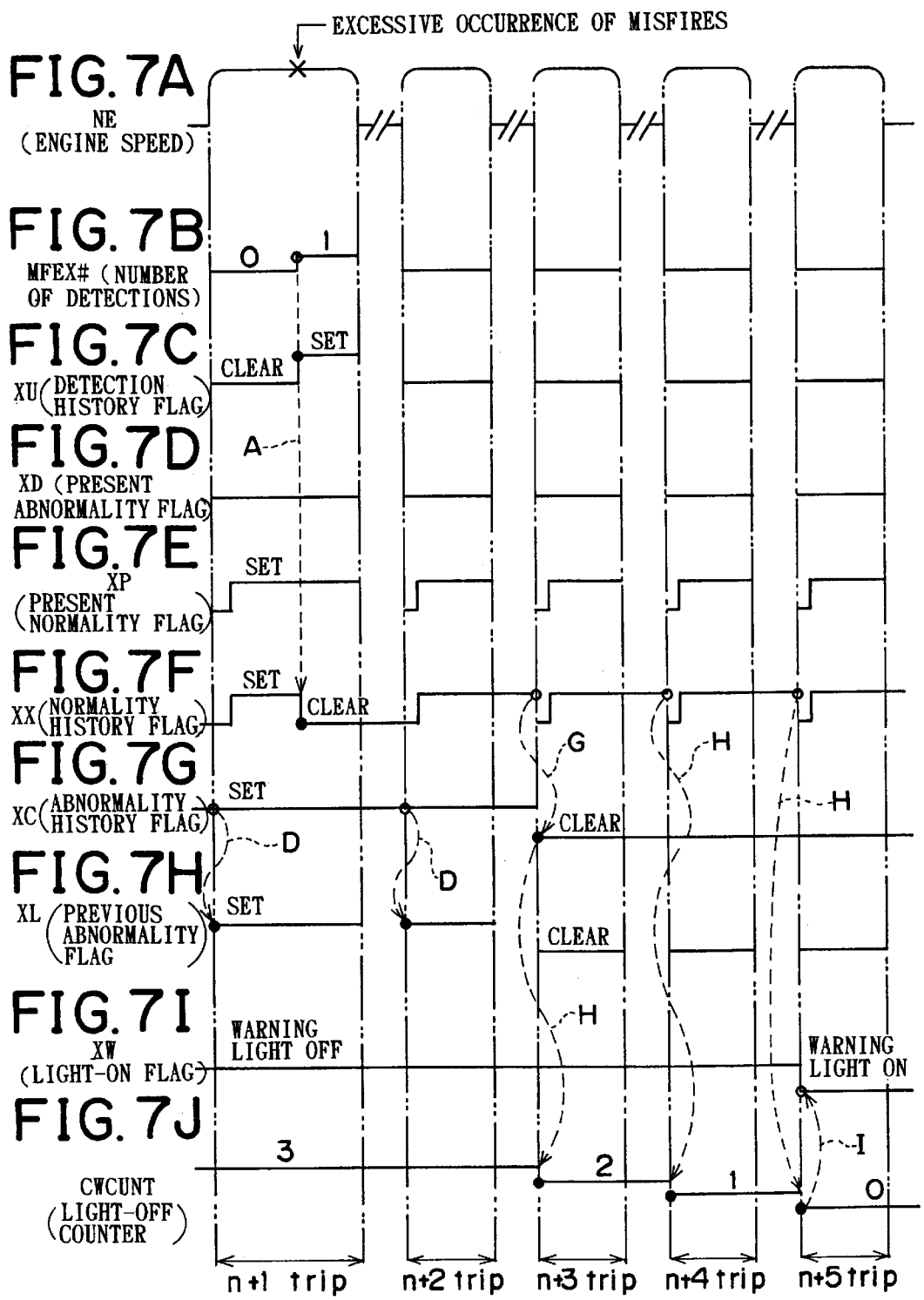

INTERNAL COMBUSTION ENGINE DIAGNOSTIC APPARATUS

INCORPORATION BY REFERENCE

The disclosure of Japanese Patent Application No. HEI 11-129793 filed on May 11, 1999 including the specification, drawings and abstract is incorporated herein by reference in its entirety.

BACKGROUND OF THE INVENTION

1. Field of the Invention

The present invention relates to a diagnostic apparatus for an internal combustion engine.

2. Description of the Related Art

Many internal combustion engines, such as vehicle engines and the like, are equipped with a well known diagnostic apparatus that determine normality/abnormality of the engine and locates an abnormality if any is detected. Such a diagnostic apparatus has a self-diagnostic function, diagnosing an abnormality based on output signals of various sensors that detect operational conditions of the engine. The apparatus constantly diagnoses whether there is a failure, and performs an operation for warning a driver and/or a fail-safe operation, etc.

An example of the aforementioned diagnostic apparatus described in Japanese Patent Application Laid-Open No. HEI 8-75612 detects the occurrence of misfire based on a change in the rotating speed of an output shaft of an internal combustion engine during an explosion stroke of the engine. Based on the frequency of detection of misfire, the apparatus determines whether the engine has an abnormality. Upon determining that the engine has an abnormality, the diagnostic apparatus immediately turns on a warning light to inform a driver of the occurrence of the abnormality.

Although it is important to notify a driver of any detection of abnormality, it is not always the case that the detected abnormality needs urgent treatment; nor is the detected abnormality necessarily permanent. That is, detected abnormalities are often transitory phenomena or phenomena that occur only under specific conditions. Therefore, the abnormality may simply dissolve when the engine is restarted. The incidence of misfire in particular, varies considerably depending on external factors, such as ambient air temperature, pressure conditions, and the like. Thus, even if there is no problem with the internal combustion engine, a misfire abnormality may be indicated depending on the operational condition of the engine, the operation environment, and the like.

Therefore, if a warning is given every time an abnormality is determined, as in the above-described apparatus, the incidence of inappropriate and/or unnecessary warnings will increase so that a driver may be annoyed or may become doubtful. The incidence of a warning can be reduced by elevating a criterion for determining an abnormality. However, an elevated criterion will also reduce the precision of the detection of abnormalities of which the driver needs to be notified.

SUMMARY OF THE INVENTION

Accordingly, it is an object of the invention to provide an internal combustion engine diagnostic apparatus capable of more appropriately producing necessary warnings regarding abnormalities in an internal combustion engine.

In accordance with the invention, a diagnostic apparatus for an internal combustion engine includes a diagnostic device for diagnosing whether an abnormality of the engine is present, and a condition management device for permitting execution of a warning that indicates the presence of an abnormality on condition that, after a first diagnosis of the presence of an abnormality, a second diagnosis of the presence of an abnormality is made after a restart of the engine.

Therefore, if after the first diagnosis of the presence of an abnormality is made by the diagnostic device, the second diagnosis of the presence of an abnormality is made after a restart of the internal combustion engine, the condition management device permits the execution of the warning, so that the warning is executed. Hence, the diagnostic apparatus reduces the incidence of execution of an unnecessary or inappropriate warning in response to a temporary abnormality that does not have repeatability, for example, an abnormality that disappears merely upon a restart of the internal combustion engine. Thus, the apparatus ensures that the warning regarding an abnormality will be executed in a more appropriate manner.

The above-described diagnostic apparatus may further have a construction wherein the condition management device includes a recovery recognizing device for recognizing whether the internal combustion engine has returned to a normal state, and wherein the condition management device permits the execution of the warning provided that the second diagnosis of the presence of an abnormality is made by the diagnostic device without a return to the normal state being recognized by the recovery recognizing device after the restart of the engine.

With this construction, in the case where after the first diagnosis of the presence of an abnormality is made by the diagnostic device, the return of the engine to the normal state is recognized by the recovery recognizing device, the condition management device does not permit the warning to be executed even if the second diagnosis of the presence of an abnormality is made by the diagnostic device after the engine is restarted. That is, if recognition of the return of the engine to the normal state intervenes between two diagnoses of the presence of abnormalities, the relevancy between the factors for the two abnormalities is considered to be low and, therefore, the warning is not executed. Therefore, it becomes possible to more favorably reduce the incidence of execution of an inappropriate or unnecessary warning The diagnostic apparatus may further have a construction as follows. That is, the diagnostic device includes a detection device for detecting occurrence of an abnormality of the internal combustion engine, and a determination device for making an abnormality determination regarding the internal combustion engine provided that a result of detection by the detection device meets a predetermined condition. Furthermore, the recovery recognizing device recognizes the return of the engine to the normal state provided that the occurrence of an abnormality is not detected by the detection device during a period between a start of the engine and a stop of the engine.

In this construction, the return of the internal combustion engine to the normal state is recognized on the condition that detection of occurrence of an abnormality, which is referred to as a criterion for the abnormality determination, is not made by the detection device during a period between a start of the engine and a stop of the engine, that is, during one operation of the engine. That is, if the internal combustion engine is operated completely normally during a trip, that is, during an operation of the engine, the relevancy between an abnormality that occurs before the trip and an abnormality that occurs after the trip is considered to be very low and, therefore, the warning regarding such an abnormality is not executed. Therefore, the incidence of an inappropriate or unnecessary warning is further reduced, so that the warning will be executed in a more appropriate situation.

The above-described diagnostic apparatus may further have a construction as follows. That is, the recovery recognizing device includes a first history retaining device (XU) for retaining a history of detection of occurrence of an abnormality by the detection device until the engine stops, and a second history retaining device (XX) for retaining a history indicating that the engine is in the normal state, even after the engine stops, on a condition that the history of detection of occurrence of an abnormality is not retained by the first history retaining device. The recovery recognizing device recognizes the return to the normal state based on a content of the history retained by the second history retaining device.

In this construction, when occurrence of an abnormality is detected by the detection device, the history of the detection of occurrence of an abnormality is retained by the first history retaining device (XU) over a period until the engine stops. A history indicating that the engine is in the normal state is retained by the second history retaining device (XX) on the condition that the abnormality occurrence detection history is not retained by the first history retaining device (XU), that is, occurrence of an abnormality is not detected at all by the detection device after the start of the engine.

Therefore, if occurrence of an abnormality is detected even once after the start of the engine for a trip, the history indicating that the engine is in the normal state is deleted from the second history retaining device (XX) at the time of the engine stop of that trip. That is, the history indicating that the engine is in the normal state is retained by the second history retaining device (XX) at the time of the engine stop of a trip, only if no occurrence of an abnormality is detected by the detection device during that trip.

As the history retained by the second history retaining device (XX) is maintained even after the engine stops, it can be recognized whether occurrence of an abnormality was detected during the previous operation of the engine between the start and the stop, on the basis of whether the aforementioned history is retained by the second history retaining device (XX) at the time of the stop of the engine. Therefore, it becomes possible to easily and reliably recognize the return of the engine to the normal state based on a fact that no occurrence of an abnormality is detected by the detection device during an operation of the engine between a start and a stop. Hence, it also becomes possible to easily and reliably recognize whether the condition for the condition management device permitting the execution of the warning is met. Furthermore, it also becomes possible to more appropriately execute the warning.

The history processing related to the history retaining device (XU, XX), including the retaining or deleting of histories or the like, can entirely be performed while the engine is being operated. Therefore, it is not necessary that the diagnostic apparatus remain functional after the engine stops. As a result, the apparatus construction can be simplified for easier realization of the apparatus.

Furthermore, the condition management device may include an abnormality diagnosis history retaining device (XC) for retaining a history of diagnosis of an abnormality by the diagnostic device even after the engine stops, and the history of diagnosis of an abnormality retained by the abnormality diagnosis history retaining device is deleted provided that the return to the normal state is recognized by the recovery recognizing device. In this construction, the condition management device determines whether the internal combustion engine has return to the normal state, and whether the diagnosis of the presence of an abnormality has been made by the diagnostic device, based on a content of the history retained by the abnormality diagnosis history retaining device.

With this construction, the history of diagnosis of an abnormality is retained by the abnormality diagnosis history retaining device (XC) even after the engine stops. The history of diagnosis of an abnormality retained by the device (XC) is deleted based o n the return to the normal state recognized by the recovery recognizing device. That is, the history of diagnosis of an abnormality is retained by the abnormality diagnosis history retaining device (XC) only in a case where the diagnosis of the presence of an abnormality is made by the diagnostic device and, after the diagnosis, the return of the internal combustion engine to the normal state is not recognized by the recovery recognizing device.

Therefore, the condition management device becomes able to more easily and reliably determine whether the diagnosis of the presence of an abnormality has been made by the diagnostic device, and whether the engine has returned to the normal state, on the basis of the content of the history retained by the abnormality diagnosis history retaining device (XC). As a result, it becomes possible to easily and reliably recognize whether the condition for the condition management device permitting the execution of the warning is met. It is also becomes possible to more appropriately execute the warning.

The history processing regarding the abnormality diagnosis history retaining device (XC), including the retaining and deleting of the history and the like, can all be performed while the engine is being operated. Therefore, it is not necessary that the diagnostic apparatus remain functional after the engine stops. As a result, the apparatus construction can be simplified for easier realization of the apparatus.

Furthermore, the condition management device may further include a temporary retaining device (XL) for, on a condition that the history of diagnosis of an abnormality is retained by the abnormality diagnosis history retaining device (XC) at a start of the engine, separately retaining the history of diagnosis of an abnormality until the engine stops. The condition management device determines that the engine has not returned to the normal state since a restart of the engine, based on a content of the history retained by the temporary retaining device.

With this construction, the history of diagnosis of an abnormality is separately retained by the temporary retaining device (XL) over a period until the internal combustion engine stops, on the condition that the history of diagnosis of an abnormality is retained by the abnormality diagnosis history retaining device (XC) at the start of the engine. That is, the abnormality diagnosis history is retained by the temporary retaining device (XL) until the engine stop of the present trip, on the condition that the diagnosis of the presence of an abnormality was made by the diagnostic device and, after the diagnosis, a state that the return of the engine to the normal state was not recognized by the recovery recognizing device continued to the engine stop of the immediately previous trip.

Therefore, the condition management device becomes able to more easily and reliably determine that the return of the engine to the normal state has not been made since a restart of the engine after the abnormality diagnosis made by the diagnostic device, on the basis of the content of the history retained by the temporary retaining device (XL). This also makes it possible to recognize whether two abnormality diagnoses were made during one and the same trip, that is, whether the engine was restarted at least once between the first abnormality diagnosis and the second abnormality diagnosis.

As a result, it becomes possible to easily and reliably recognize whether the condition for the condition management device permitting the execution of the warning is met. It is also becomes possible to more appropriately execute the warning.

The history processing regarding the temporary retaining device (XL), including the retaining and deleting of the history and the like, can all be performed while the engine is being operated. Therefore, it is not necessary that the diagnostic apparatus remain functional after the engine stops. As a result, the apparatus construction can be simplified for easier realization of the apparatus.

The condition management device may permit the execution of the warning provided that the diagnosis of the presence of an abnormality is made by the diagnostic device when the history of diagnosis of an abnormality is retained by the temporary retaining device (XL).

With this construction, the condition management device permits the execution of the warning on the condition that when the abnormality diagnosis history is retained by the temporary retaining device (XL), that is, when the internal combustion engine has not returned to the normal state since a restart of the engine after the diagnosis of the presence of an abnormality was made by the diagnostic device, the diagnosis of the presence of an abnormality is made again by the diagnostic device. By using the contents of the histories retained by the history retaining devices and the abnormality diagnosis history retaining device as a basis, it becomes possible to easily and reliably determine whether the condition for permitting the execution of the warning is met and, therefore, it becomes possible to more appropriately execute the warning.

The history processing regarding the history retaining devices and the abnormality diagnosis history retaining device, including the retaining and deleting of the histories and the like, can also be entirely performed while the engine is being operated. Therefore, it is not necessary that the diagnostic apparatus remain functional after the engine stops. As a result, the apparatus construction can be simplified for easier realization of the apparatus.

The diagnostic apparatus of the invention may further have a construction as follows. That is, the detection device detects an excessive occurrence of misfires in the internal combustion engine, and the diagnostic device diagnoses the presence of an abnormality of the internal combustion engine provided that a number of times of detection of the excessive occurrence of misfires by the detection device is equal to or greater than a predetermined number.

The incidence, or rate of occurrence, of a misfire considerably varies depending on external operational conditions of an internal combustion engine, such as ambient air temperature conditions, pressure conditions, and the like, as mentioned above. In the above-described diagnostic apparatus, the condition management device permits the warning to be executed only in the case where following the first abnormality diagnosis, the second diagnosis of the presence of an abnormality is made by the diagnostic device after a restart of the engine. Therefore, if the diagnostic apparatus of the invention is applied to a diagnostic apparatus that performs diagnostics regarding a misfire, which is highly likely to cause an abnormality determination that does not have repeatability, the warning regarding an abnormality will be executed in a more appropriate situation.

The condition management device may stop the execution of the warning provided that the return of the engine to the normal state is recognized by the recovery recognizing device consecutively at least a predetermined number of times during the execution of the warning.

BRIEF DESCRIPTION OF THE DRAWINGS

The foregoing and further objects, features and advantages of the present invention will become apparent from the following description of a preferred embodiment with reference to the accompanying drawings, wherein like numerals are used to represent like elements and wherein:

FIGS. 6A to 6J are time charts indicating a manner of the diagnostic operation according to the embodiment, wherein FIG. 6A indicates time-dependent transition of the engine revolution speed, and FIG. 6B indicates time-dependent transition of the number of times of detecting an excessive occurrence of misfires, and FIG. 6C indicates time-dependent transition of a detection history flag, and FIG. 6D indicates time-dependent transition of a present abnormality flag, and FIG. 6E indicates time-dependent transition of a present normality flag, and FIG. 6F indicates time-dependent transition a normality history flag, and FIG. 6G indicates time-dependent transition of an abnormality history flag, and FIG. 6H indicates time-dependent transition of a previous abnormality flag, and FIG. 6I indicates time-dependent transition of a light-on flag, and FIG. 6J indicates time-dependent transition of a light-off counter; and FIGS. 7A to 7J are time charts indicating a manner of the diagnostic operation according to the embodiment, wherein FIG. 7A indicates time-dependent transition of the engine revolution speed, and FIG. 7B indicates time-dependent transition of the number of times of detecting an excessive occurrence of misfires, and FIG. 7C indicates time-dependent transition of the detection history flag, and FIG. 7D indicates time-dependent transition of the present abnormality flag, and FIG. 7E indicates time-dependent transition of the present normality flag, and FIG. 7F indicates time-dependent transition the normality history flag, and FIG. 7G indicates time-dependent transition of the abnormality history flag, and FIG. 7H indicates time-dependent transition of the previous abnormality flag, and FIG. 7I indicates time-dependent transition of the light-on flag, and FIG. 7J indicates time-dependent transition of the light-off counter.

DETAILED DESCRIPTION OF PREFERRED EMBODIMENT

A preferred embodiment of the internal combustion engine diagnostic apparatus of the invention will be described in detail hereinafter with reference to the accompanying drawings.

First, an internal combustion engine (vehicle engine) to which the embodiment of the diagnostic apparatus is applied will be described with reference to FIG. 1.

Figure 1:
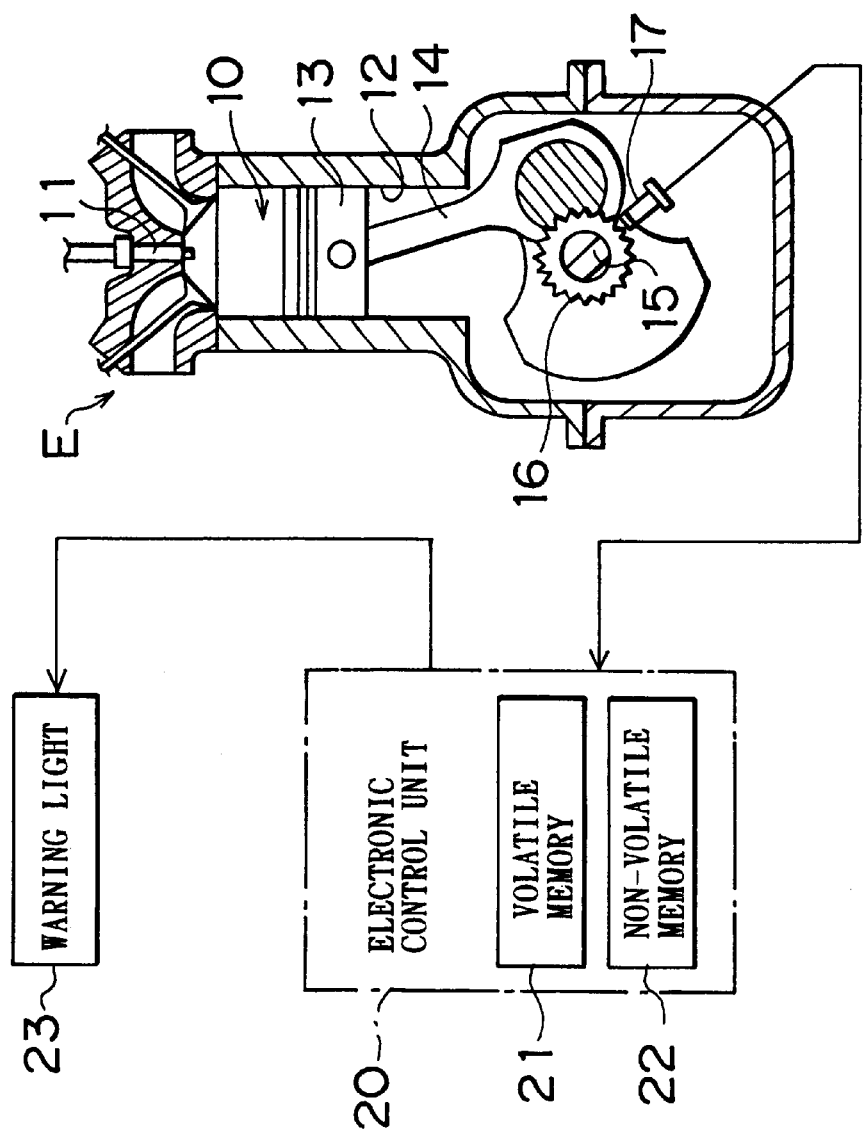
FIG. 1 is a schematic illustration of the overall construction of an embodiment of the internal combustion engine diagnostic apparatus of the invention.

Referring to FIG. 1, an internal combustion engine E is a spark injection type internal combustion engine in which a spark caused by discharge from an ignition plug 11 is used to ignite a mixture introduced into a combustion chamber 10. The explosion of an ignited mixture pushes a piston 13 that is provided for reciprocating movements in a cylinder 12, thereby rotating a crankshaft 15 that is connected to the piston 13 by a connecting rod 14.

The crankshaft 15 is provided with an engine revolution speed (NE) detection rotor 16 in such a manner that the crankshaft 15 and the speed detection rotor 16 rotate together. The speed detection rotor 16 has, on its outer peripheral surface, a plurality of signal teeth that are formed at predetermined angle intervals. A revolution speed sensor 17, formed by an electromagnetic pickup, is provided adjacent to the speed detection rotor 16. The revolution speed sensor 17 outputs a pulsed signal (NE signal) to an electronic control unit 20 for each signal tooth of the speed detection rotor 16 passing by the revolution speed sensor 17 during rotation of the crankshaft 15. The electronic control unit 20 detects a rotational phase of the crankshaft 15 from NE signals and, based on the rotational phase, calculates the revolution speed of the engine E and the like.

The electronic control unit 20 constantly detects the operational condition of the engine E by using various sensors that include the revolution speed sensor 17. Based on a result of the detection, the electronic control unit 20 controls the operation of the engine E. The electronic control unit 20 also always monitors a control system of the engine E through the various sensors and the like, and performs self-diagnostics, including determination as to normality/abnormality of the control system, determination of the location of an abnormality, and the like.

The electronic control unit 20 has a volatile memory 21 and a non-volatile memory 22, as storage devices for storing results of detection by the various sensors, results of computation related to the control of the engine E, and the like. The information stored in the volatile memory 21 is retained only during electrification of the electronic control unit 20, and it is entirely lost when the electrification of the electronic control unit 20 discontinues at the time of a stop of the engine E. That is, the information stored in the volatile memory 21 is retained only until the end of a present trip of the vehicle (i.e., during a period from the start of the present operation of the engine E to the stop thereof), and cannot be carried over to the next trip, that is, a period starting at the next start of the engine E.

On the other hand, the non-volatile memory 22, backed up by a battery (not shown) or the like, retains the stored information even during the powered-off state of the electronic control unit 20. Therefore, the information stored in the non-volatile memory 22 is retained intact even during a non-operational state of the engine E, and is carried over to the next trip of the vehicle. Thus, the non-volatile memory 22 stores information that needs to be used also for the next and later trips, including learned values that are required for various controls of the engine E, results of the aforementioned self-diagnostics, and the like.

As part of the self-diagnostics, the electronic control unit 20 of the diagnostic apparatus performs a diagnostic regarding misfire by monitoring the engine E for a misfire state.

Depending on the result of the diagnostic, the electronic control unit 20 turns on a warning light 23 to warn a driver.

The misfire diagnostic will be described below.

A method employed by the diagnostic apparatus to detect occurrence of a misfire in the engine E will first be described.

The electronic control unit 20 of the diagnostic apparatus detects occurrence of a misfire in the engine E from output signals of the revolution speed sensor 17. As mentioned above, the electronic control unit 20 detects the rotational phase of the crankshaft 15 from the NE signals from the revolution speed sensor 17. Based on the NE signals, the electronic control unit 20 constantly measures a time $\Delta T$ required for a predetermined crank angle rotation of the crankshaft 15 ($\Delta T = T/30°$ CA (crank angle)). The time (predetermined crank angle rotation time) $\Delta T$ is inversely proportional to the rotation speed of the crankshaft 15.

Figure 2:
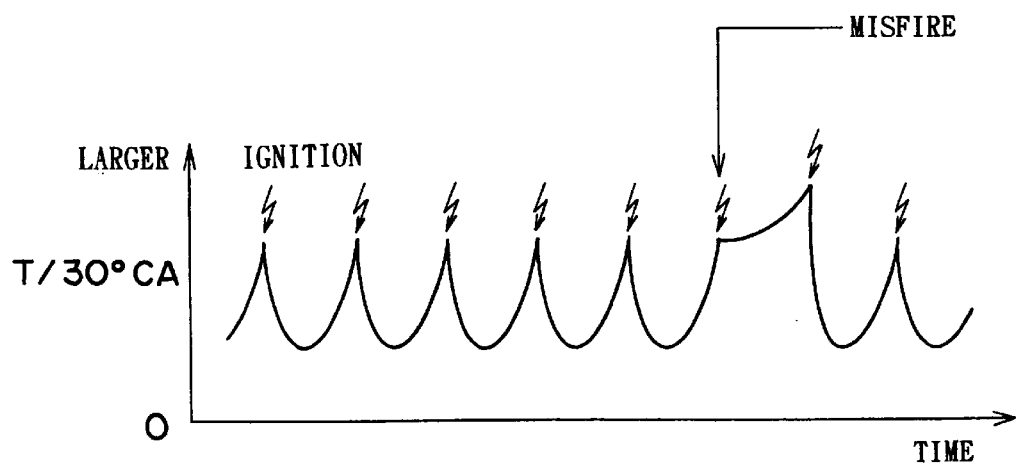
FIG. 2 is a time chart indicating changes of the time for rotation of a predetermined crank angle.

FIG. 2 indicates changes of the predetermined crank angle rotation time $\Delta T$.

Upon ignition by discharge from the ignition plug 11, the explosion of a mixture rapidly pushes the piston 13, so that the rotation of the crankshaft 15 temporarily accelerates. The acceleration gradually decreases due to pumping loss, friction and the like. At a certain time point, the rotation of the crankshaft 15 starts to decelerate. Subsequently, the rotation of the crankshaft 15 gradually decelerates until the next ignition. Thus, the predetermined crank angle rotation time $\Delta T$ shortens at every time of ignition, that is, undergoes substantially periodical fluctuations with substantially equal amplitudes as indicated in FIG. 2.

However, if a misfire occurs, that is, if explosion of a mixture does not occur despite an ignition operation, the rotation of the crankshaft 15 is not accelerated, so that the predetermined crank angle rotation time $\Delta T$ continues increasing after the ignition operation. That is, if a mistier occurs, the rotation speed of the crankshaft 15 does not accelerate but continues decelerating after the ignition operation. Therefore, by monitoring the fluctuation of the predetermined crank angle rotation time $\Delta T$, occurrence of a misfire can be detected. In this manner, the diagnostic apparatus constantly monitors the operation of the engine E for a misfire state and, based on the incidence of a misfire, detects excessive occurrence of misfires, that is, an abnormality of the engine E.

Figure 3A:
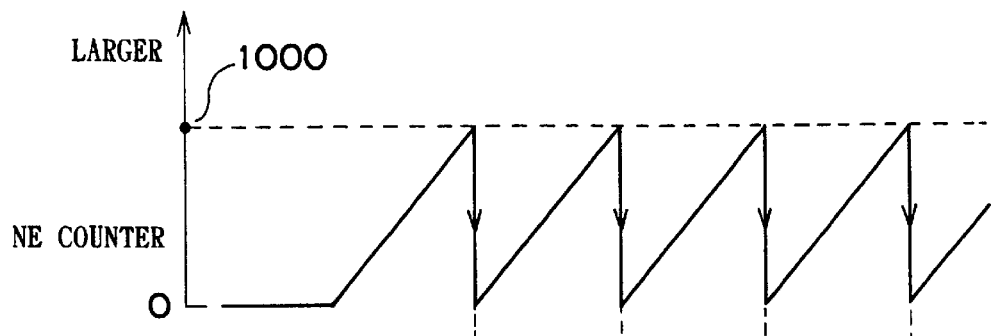
FIG. 3A is a time chart indicating transition of an speed (NE) counter used for misfire abnormality determination.
Figure 3B:
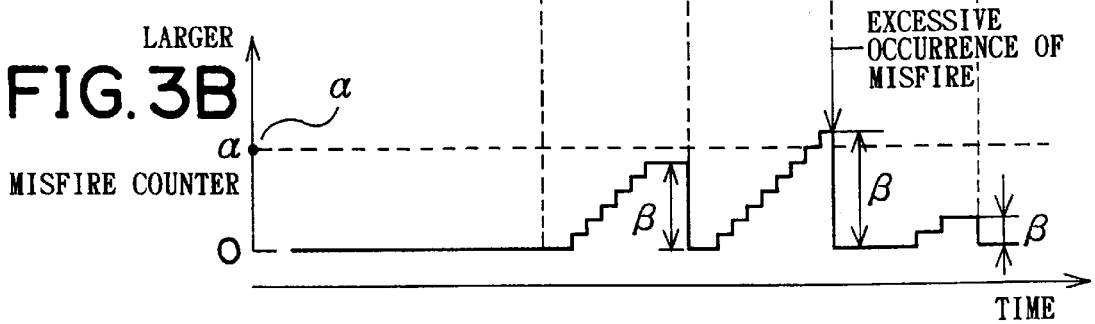
FIG. 3B is a time chart indicating transition of a misfire counter used for misfire abnormality determination.

FIGS. 3A and 3B are time charts of the transitions of two counters that are related to detection of the excessive occurrence of misfires.

A specific example of the method employed by the diagnostic apparatus to detect the excessive occurrence of misfires will be described with reference to FIGS. 3A and 3B.

The electronic control unit 20 adds "1" to the value of an NE counter, the transition of which is indicated in FIG. 3A, at every time of detecting one whole rotation of the crankshaft 15 based on the output signals from the revolution speed sensor 17. When the value of the NE counter reaches "1000", the electronic control unit 20 clears the value to "0".

Concurrently with the operation on the NE counter, the electronic control unit 20 adds "1" to the value of a misfire counter MFCNT, whose transition is indicated in FIG. 3B, every time of detecting occurrence of a misfire based on the predetermined crank angle rotation time $\Delta T$. When the value of the NE counter is cleared, the current value $\beta$ of the misfire counter MFCNT is stored, and then cleared to "0". Thus, the value $\beta$ indicates the number of misfires occurring during 1000 revolutions of the engine E.

The electronic control unit 20 detects the excessive occurrence of misfires on a condition that the value β is greater than a predetermined value α. When the excessive occurrence of misfires is detected, the electronic control unit 20 stores the current operational condition of the engine E (engine revolution speed, throttle opening extent, and the like) as history information.

The diagnostic apparatus of this embodiment constantly monitors the operation of the engine E for a misfire state in the above-described manner. Based on a result of the monitoring, the diagnostic apparatus performs diagnostic-related operations, for example, the normality/abnormality determination with respect to misfire, the switching on/off of the warning light 23, and the like.

Figure 4:
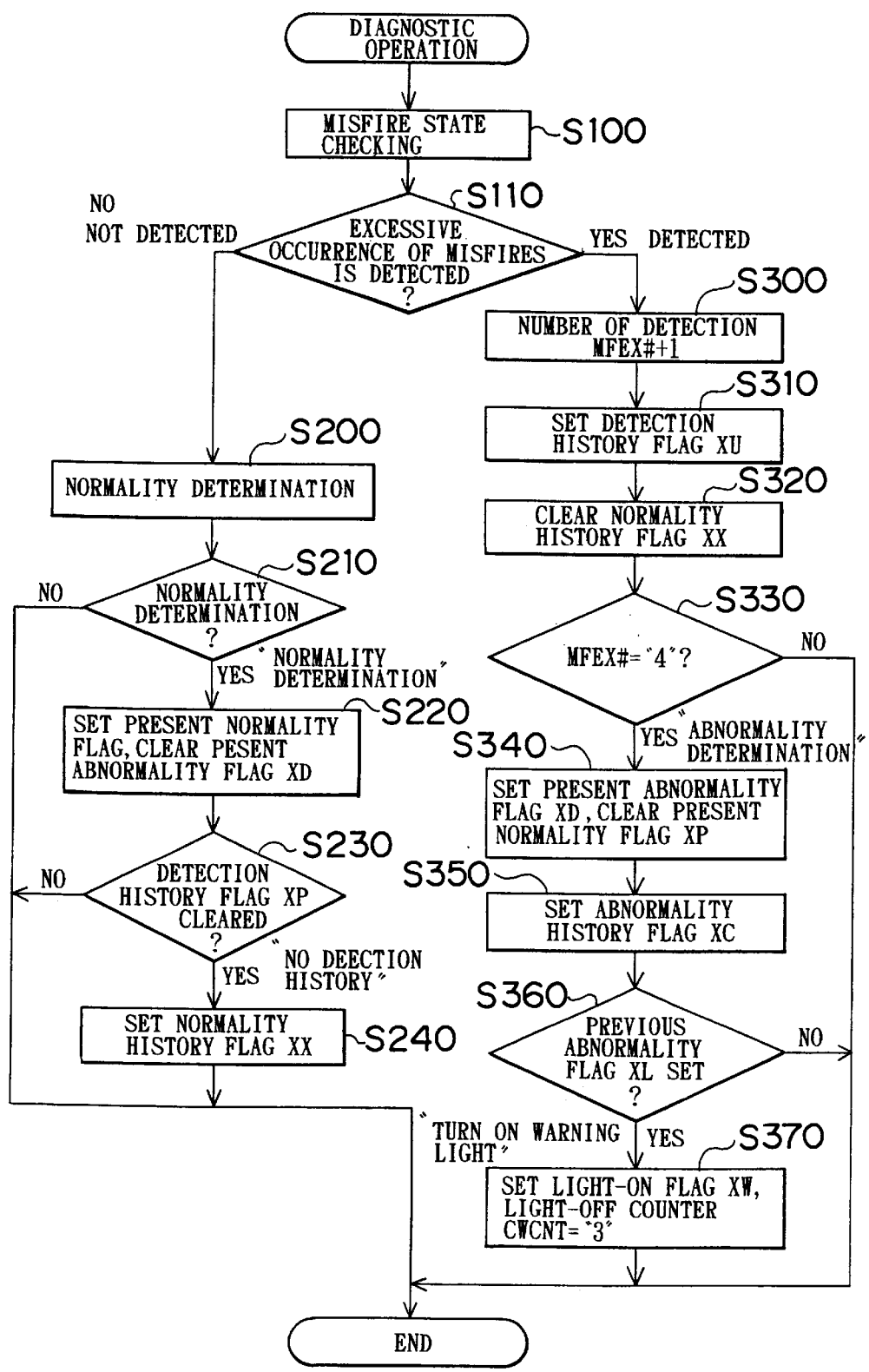
FIG. 4 is a flowchart illustrating a procedure of a diagnostic operation according to the embodiment.

FIG. 4 is a flowchart illustrating a procedure of the misfire diagnostic operation executed by the electronic control unit 20. This diagnostic operation will be further described below with reference to FIG. 4.

In step S100, the electronic control unit 20 of the diagnostic apparatus performs a misfire state check. After that, the electronic control unit 20 executes processing as described below.

In step S110, the electronic control unit 20 determines whether the excessive occurrence of misfires is detected by the misfire state check. If the excessive occurrence of misfires is not detected (NO in step S110), the electronic control unit 20 makes normality determination in step S200, provided that one of the following conditions is met.

(a1) No excessive occurrence of misfires has been detected since the start of the engine E.

(a2) Even though an excessive occurrence of misfires has been detected since the start of the engine E, it has been recognized that since the detection of the excessive occurrence of misfires, no other excessive occurrence of misfires has been detected under the same operational conditions (engine revolution speed, ignition timing, fuel injection amount, and the like) as those occurring at the time of the detection.

If the normality determination is not made (NO in step S210), the electronic control unit 20 temporarily ends the process without executing any further processing.

Conversely, if the normality determination is made (YES in step S210), the electronic control unit 20 proceeds to step S220, in which the electronic control unit 20 sets a present normality flag XP, and clears a present abnormality flag XD if it has been set.

The present normal flag XP and the present abnormality flag XD indicate the history regarding "normality presently determined" and the history regarding "abnormality presently determined", respectively. The status of each flag XP, XD is stored in the volatile memory 21.

After storing "normality presently determined" by setting the present normality flag XP, the electronic control unit 20 determines in step S230 whether a detection history flag XU has been cleared at the moment. Only if the detection history flag XU has been cleared (YES in step S230), the electronic control unit 20 sets a normality history flag XX in step S240.

The detection history flag XU indicates the history of detection of an excessive occurrence of misfires (one of the abnormalities of the engine E) during the present operation of the engine E, that is, "excessive occurrence of misfires (abnormality) detection history". The status of the detection history flag XU is stored in the volatile memory 21. The normality history flag XX indicates that the engine E is in a normal condition (that is, "history of present occurrence of normal condition"). The status of the normality history flag XX is stored in the non-volatile memory 22, and therefore is retained even after the engine E stops.

The detection history flag XU is set if an excessive occurrence of misfires has been detected at least once during the present operation of the engine E. The status of the flag XU indicating the presence of the "excessive occurrence of misfires detection history" is retained until the engine E stops. This will be described in detail later.

After setting the normality history flag XX on the condition that the detection history flag XU has been cleared, the electronic control unit 20 temporarily ends the process. The above-described process is performed in a case where an excessive occurrence of misfires is not detected by the checking for a misfire state.

Conversely, in a case where an excessive occurrence of misfires is detected by the checking for a misfire state in step S100 (YES in step S110), the electronic control unit 20 performs a process as follows.

In step S300, the electronic control unit 20 adds "1" to the value of a number of times of detection counter MFEX# that indicates the number of times of detection of the excessive occurrence of misfires during the present operation of the engine E. Subsequently in step S310, the electronic control unit 20 sets the detection history flag XU to store the fact that the excessive occurrence of misfires has been detected at least once during the present operation of the engine E.

Subsequently in step S320, the electronic control unit 20 clears the normality history flag XX if it has been set. The normality history flag XX is cleared on the condition that the detection history flag XU is set and the "history of detection of an excessive occurrence of misfires" is stored.

The diagnostic apparatus of this embodiment makes the abnormality determination on the following condition.

(b1) The excessive occurrence of misfires has been detected at least four times during the present operation of the engine E.

Therefore, the electronic control unit 20 checks in step S330 whether the value of the number of times of detection counter MFEX# is equal to or greater than "4", that is, whether the excessive occurrence of misfires has been detected at least four times during the present operation of the engine E. Through this operation, the electronic control unit 20 determines whether to make the abnormality determination.

If the abnormality determination is not made (NO in step S330), the electronic control unit 20 temporarily ends the process. Conversely, if the abnormality determination is made (YES in step S330), the electronic control unit 20 executes a process as follows.

In step S340, the electronic control unit 20 sets the present abnormality flag XD to store the "abnormality diagnosis history", and clears the present normality flag XP. Subsequently in step S350, the electronic control unit 20 sets an abnormality history flag XC for storing the history information regarding the presence of the "abnormality diagnosis history". The status of the abnormality history flag XC is stored in the non-volatile memory 22, and therefore is retained even after the engine E stops. In this embodiment, once the abnormality determination is made, the diagnostic apparatus considers the abnormal state to continue and keeps the abnormality history flag XC set until the apparatus recognizes the "return to the normal state" of the engine E. The condition for the "return to the normal state" and the like will be described in detail later.

After storing the history regarding the abnormality determination, the electronic control unit 20 determines in step S360 whether a previous abnormality flag XL has been set. If the previous abnormality flag XL has not been set (NO in step S360), the electronic control unit 20 temporarily ends the process.

Conversely, if the previous abnormality flag XL has been set (YES in step S360), the electronic control unit 20 sets a light-on flag XW and sets the value of a light-off counter CWCNT to "3" in step S370.

The previous abnormality flag XL is a flag that is set in order to retain the "abnormality diagnosis history" of the abnormality history flag XC until the engine E stops provided that the abnormality history flag XC is set at the time of the start of the present operation of the engine E. The status of the previous abnormality flag XL is stored in the volatile memory 21. The condition for setting the previous abnormality flag XL and the like will be described later.

The light-on flag XW is a flag that is set to indicate that the condition for turning on the warning light 23 is satisfied. Provided that the light-on flag XW has been set, the electronic control unit 20 turns on the warning light 23 to warn a driver. The status of the light-on flag XW is stored in the non-volatile memory 22.

The light-off counter CWCNT is used to determine the timing of turning off the warning light 23 after it is turned on. The function of the light-off counter CWCNT and the like will also be described later.

Thus, the diagnostic apparatus turns on the warning light 23 only if the abnormality determination (diagnosis of the presence of an abnormality) has been made and the previous abnormality flag XL has been set. After setting the light-on flag XW and the light-off counter CWCNT in this manner, the electronic control unit 20 temporarily ends the process.

The diagnostic apparatus of this embodiment repeatedly performs the diagnostic operation related to the checking for a misfire state, the normality/abnormality determination, the turning on of the warning light 23, and the like while the internal combustion engine E is being operated.

In this embodiment, the diagnostic apparatus performs a startup operation when the engine E is started, in order to check the status of the previous trip of the vehicle (i.e., the period between the previous start to the previous stop of the engine E). This status checking is performed by referring to, for example, the status of the normality history flag XX and the status of the abnormality history flag XC stored in the non-volatile memory 22.

The cleared status of the normality history flag XX is retained until the engine E stops, if the excessive occurrence of misfires has been detected at least once during the present operation of the engine E. Therefore, on the basis of the information indicated by the normality history flag XX at the time of the start of the engine E, it is possible to check whether the excessive occurrence of misfires was detected at least once during the previous trip, that is, the previous period between start and stop of the engine E.

Even after the abnormality determination is made, the diagnostic apparatus determines the "return to the normal state" from the abnormal state on the condition that the engine E is operated normally during the trip. Therefore, if the normality history flag XX has been set at the time of a start of the engine E, the "return to the normal state from the abnormal state" can be recognized.

The abnormality history flag XC is set if the abnormality determination is made. Once the abnormality history flag XC is set, the setup status of the abnormality history flag XC is maintained until the "return to the normal state" is recognized. Therefore, if the abnormality history flag XC has the setup status at the time of a start of the engine E, it can be recognized that "continuation of the abnormality state at the previous stop of the engine E", that is, that "after the abnormality determination is made, the return to the normal state is not recognized after the restart of the engine E".

Figure 5:
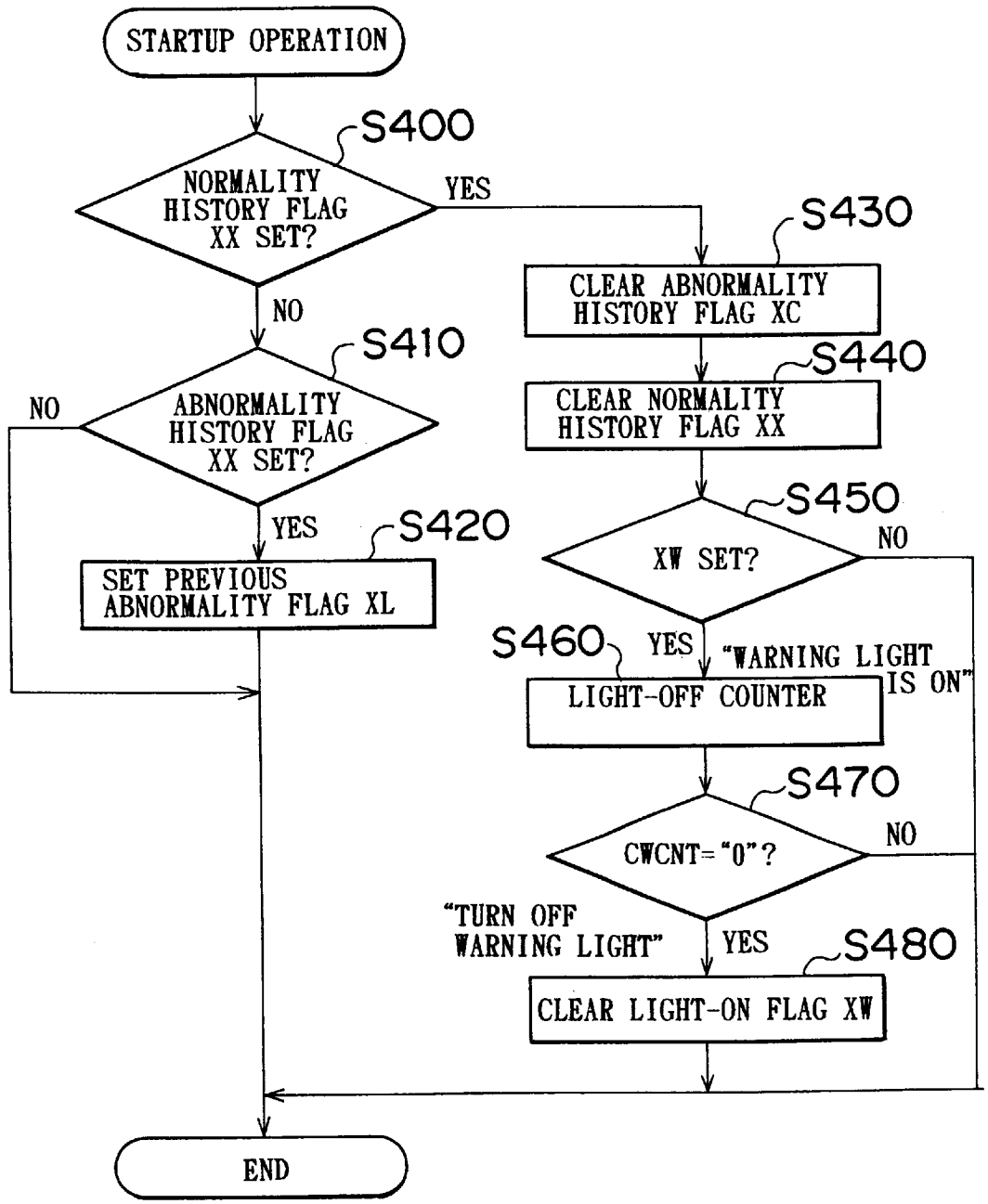
FIG. 5 is a flowchart illustrating a procedure of a startup operation according to the embodiment.

FIG. 5 is a flowchart illustrating a procedure for the electronic control unit 20 to execute the startup operation.

When the engine E is started, the electronic control unit 20 first determines in step S400 whether the normality history flag XX has the setup status. If the normality history flag XX has the setup status (YES in step S400), the electronic control unit 20 proceeds to step S430. In step S430, the electronic control unit 20 clears the abnormality history flag XC if it is set, in order to delete the "abnormality diagnosis history". Subsequently in step S440, the electronic control unit 20 temporarily clears the normality history flag XX. The reason for clearing the abnormality history flag XC is that it is recognized that the engine E was normally operated during the previous trip and therefore that the "return to the normal state" has been made.

Subsequently in step S450, the electronic control unit 20 determines whether the light-on flag XW has the setup status. If the light-on flag XW does not have the setup status, that is, if the warning light 23 is not on (NO in step S460), the electronic control unit 20 ends the startup operation.

Conversely, if the light-on flag XW has the setup status and the warning light 23 is on (YES in step S450), the electronic control unit 20 proceeds to step S460, in which the electronic control unit 20 subtracts "1" from the value of the light-off counter CWCNT.

Subsequently in step S470, the electronic control unit 20 determines whether the value of the light-off counter CWCNT equals "0" as a result of the processing in step S460. If the value of the light-off counter CWCNT is "0" (YES in step S470), the electronic control unit 20 proceeds to step S480. In step S480, the electronic control unit 20 clears the light-on flag XW and turns off the warning light 23. Thus, the diagnostic apparatus of the embodiment turns off the warning light 23 only in a case where after the warning light 23 is turned on, the engine E is normally operated during three trips without the abnormality determination being made again, that is, without the value of the light-off counter CWCNT being set to "3" again.

If the normality history flag XX has the cleared status at the time of a start of the engine E (NO in step S400), the electronic control unit 20 determines whether the abnormality history flag XC has the setup status in step S410. If the abnormality history flag XC has the setup status (YES in step S410), the electronic control unit 20 recognizes that "the abnormality determination was made, and the return to the normal state has not been recognized since the restart of the engine E". Subsequently in step S420, the electronic control unit 20 sets the previous abnormality flag XL to retain the "abnormality diagnosis history" indicated by the abnormality history flag XC until the end of the present operation of the engine E. After that, the electronic control unit 20 ends the startup operation.

If the normality history flag XX and the abnormality history flag XC both have the cleared status at the time of a start of the engine E (NO in step S400 and step S410), the electronic control unit 20 ends the startup operation without executing any further processing.

Thus, the diagnostic apparatus of the embodiment performs the normality/abnormality determination as to misfire and the switching on/off of the warning light 23 based on the flag processings executed by the electronic control unit 20 in the diagnostic operation and the startup operation.

The diagnostic apparatus turns on the warning light 23 to warn a driver when the following two conditions are both met, as mentioned above.

(c1) The abnormality determination (diagnosis of the presence of an abnormality) is made.

(c2) At the time of the abnormality determination, the previous abnormality flag XL has the setup status.

That is, in the diagnostic apparatus, the execution of warning with regard to an abnormality is permitted on the condition that the present abnormality flag XD is set when the abnormality determination is made and that the previous abnormality flag XL has the setup status and the "abnormality diagnosis history" is retained, that is, the condition that "after the first abnormality determination is made, the second abnormality determination is made without the return to the normal state being recognized after a restart of the internal combustion engine".

FIGS. 6A to 6J and 7A to 7J are time charts illustrating manners of diagnostics performed by the diagnostic apparatus of the embodiment. Next described in detail with reference to FIGS. 6A to 6J and 7A to 7J will be how the diagnostic apparatus performs diagnostics.

In the following description, it is assumed that the warning light 23 is turned on during a trip n. FIGS. 6A to 6J illustrate manners of operation performed during the three trips preceding trip n and trip n, that is, during trips n−3 to n. FIGS. 7A to 7J illustrate manners of operation performed during the five trips following trip n, that is, during trips n+1 to n+5. It is also assumed that the engine E is operated normally up to trip n−3 indicated in FIGS. 6A to 6J.

Furthermore, it is assumed in those time charts that an excessive occurrence of misfires is detected at a time point indicated by "x" in FIGS. 6A and 7A. The number of excessive occurrences of misfires detected after the engine E is started is indicated by the number of times of detection counter MFEX# as in FIGS. 6B and 7B.

First, the diagnostic operations performed by the diagnostic apparatus before the turning on of the warning light 23 will be described with reference to FIGS. 6A to 6J, in correspondence to the procedure of the diagnostic operation and the procedure of the startup operation illustrated in FIGS. 4 and 5.

During trip n−3, the detection history flag XU (FIG. 6C) and the present abnormality flag XD (FIG. 6D) have the cleared status because no excessive occurrence of misfires is detected before. The present normality flag XP (FIG. 6E) and the normality history flag XX (FIG. 6F) are set when the normality determination is made during the initial checking for a misfire state and, after that, the setup status of the flags are maintained (steps S200–S240 in FIG. 4).

Subsequently during trip n−2, the excessive occurrence of misfires is detected four times, so that the abnormality determination is made for the first time in this example operation.

At the time of detection of the first excessive occurrence of misfires during trip n−2, the detection history flag XU is set as indicated by an arrow A. After that, the setup status of the detection history flag XU is maintained until the engine E stops. The normality history flag XX is cleared at the time of the first excessive occurrence of misfires (steps S310 and S320 in FIG. 4) as indicated in FIG. 6F.

At the time of detection of the fourth excessive occurrence of misfires during trip n−2, the present abnormality flag XD and the abnormality history flag XC (FIG. 6G) are set as indicated by arrows B, C, and the present normality flag XP is cleared (steps S330–S350 in FIG. 4). In this case, the warning light 23 is not turned on, because the previous abnormality flag XL (FIG. 6H) is not set (step S360 in FIG. 4).

The history of the normality history flag XX cleared during trip n−2 and the history of the abnormality history flag XC set during the trip are stored in the non-volatile memory 22, so that their histories are maintained at the start of the engine E for the next trip n−1. Therefore, at the start of the engine E for trip n−1, the previous abnormality flag XL is set as indicated by an arrow D on the condition that the normality history flag XX has the cleared status and that the abnormality history flag XC has the setup status (steps S400–S420 in FIG. 5).

During trip n−1, the excessive occurrence of misfires is detected only once. Upon this detection, the detection history flag XU is set and the normality history flag XX is cleared as indicated by the arrow A (steps S310, S320 in FIG. 4), as is the case with the first detection of the excessive occurrence of misfires during the previous trip n−2. Furthermore, during trip n−1, the abnormality history flag XC is not operated but maintained with the setup status, which is carried over to the next trip n (step S330 in FIG. 4).

At the start of the engine E for trip n, the previous abnormality flag XL is also set as indicated by the arrow D because the normality history flag XX has the cleared status and the abnormality history flag XC has the setup status (steps S400–S420 in FIG. 5), as is the case with the flag processing at the start of the engine E for the previous trip n−1. In this example, after the abnormality determination during trip n−2, the "return to the normal state" is not recognized up to trip n, that is, the abnormal state continues.

During trip n, the excessive occurrence of misfires is detected four times, so that the abnormality determination is made for the second time in this example, following the first one made during trip n−2. As is the case with trip n−2, the present abnormality flag XD is set as indicated by the arrow B (steps S330, S340 in FIG. 4). Furthermore, at the start of the engine E for trip n, the previous abnormality flag XL (FIG. 6H) is set by the startup operation (steps S400–S420 in FIG. 5). Therefore, the abnormality determination made during trip n means "an abnormality determination that is subsequent to the first abnormality determination, without the return from the abnormal state to the normal state being recognized after a restart of the internal combustion engine". Therefore, the light-on flag XW (FIG. 6I) is set and the warning light 23 is turned on, as indicated by an arrow F. At this moment, the value of the light-off counter CWCNT is set to "3" (steps S360, S370 in FIG. 4).

Thus, the diagnostic apparatus turns on the warning light 23 on the condition that "after the first abnormality determination, the second abnormality determination is made without the return to the normal state being recognized after a restart of the engine E.

The diagnostic operations, following the turning on of the warning light 23, which are performed to turn off the warning light 23, will be described with reference to FIGS. 7A to 7J, in correspondence to the procedures of the diagnostic operation and the startup operation illustrated in FIGS. 4 and 5.

After trip n, during which the warning light 23 is turned on, the engine E is started for the next trip, that is, trip n+1. At the start of the engine E for trip n+1, the normality history flag XX (FIG. 7F) has the cleared status and the abnormality history flag XC (FIG. 7G) has the setup status, so that the previous abnormality flag XL (FIG. 7H) is set as indicated by an arrow D (steps S400–S420 in FIG. 5), as is the case with the previous trip n or the like. During trip n+1, the status of the light-on flag XW set up during the previous trip n is maintained, so that the warning light 23 continues to be on (step S370 in FIG. 4, and steps S400–S420 in FIG. 5).

During trip n+1, the excessive occurrence of misfires is detected only once. Upon this detection, the normality history flag XX is cleared as indicated by an arrow A. The cleared status of the normality history flag XX is carried over to the next trip n+2 (steps S300–S320 in FIG. 4). During trip n+1, the abnormality history flag XC remains at the setup status, which is also carried over to the next trip n+2. Therefore, at the start of trip n+2, the previous abnormality flag XL is set as indicated by an arrow D (steps S400–S420 in FIG. 5).

During trip n+2, no excessive occurrence of misfires is detected, so that the status of the normality history flag XX set up at the time of the initial checking for a misfire state continues and is carried over to the next trip n+3. Therefore, at the start of the engine E for trip n+3, the normality history flag XX has the setup status, so that the abnormality history flag XC is cleared and the previous abnormality flag XL remains at the cleared status as indicated by an arrow G (steps S400, S430, S440 in FIG. 5).

That is, at the start of the engine E for trip n+3, the "return to the normal state" from the abnormal state continuing from the first abnormality determination made in trip n−2 is recognized.

Furthermore, as the normality history flag XX is at the setup status at this moment, the value of the light-off counter CWCNT is reduced by "1" to equal "2". However, the light-on flag XW remains at the setup status, so that the warning light 23 continues to be on during trip n+2 (steps S450–S470 in FIG. 5).

During and after trip n+2 in this example, no excessive occurrence of misfires is detected. Therefore, at the start of the engine E for each of trips n+3 to n+5, the normality history flag XX is set, so that the value of the light-off counter CWCNT is reduced by "1" as indicated by an arrow H, as is the case with the start of trip n+3. The value of the light-off counter CWCNT is reduced finally to "0" at the start of the engine E for trip n+5. At this moment, the light-on flag XW is cleared, so that the warning light 23 is turned off (steps S450–S480 in FIG. 5).

Thus, the diagnostic apparatus turns off the warning light 23 on the condition that after the warning light 23 is turned on, the diagnostic apparatus experiences three trips (not necessarily consecutive) during which no excessive occurrence of misfires is detected so that no diagnosis of the presence of an abnormality is made.

As can be seen from the foregoing description, the diagnostic apparatus of this embodiment achieves various advantages as stated below.

The diagnostic apparatus of the embodiment turns on the warning light 23 to warn a driver only in the case where the diagnosis of the presence of an abnormality is made in two trips, that is, only in the case where "after the first diagnosis of the presence of an abnormality is made, the second diagnosis of the presence of an abnormality is made after a restart of the internal combustion engine". Therefore, the diagnostic apparatus favorably reduces the incidence of an inappropriate or unnecessary warning in response to a temporary abnormality that does not have repeatability. That is, it becomes possible to more appropriately produce a necessary warning in response to an abnormality of an internal combustion engine.

In a case where after the abnormality determination is made, the "return of the engine E to the normal state" is recognized and, after the recognition, the abnormality determination (diagnosis of the presence of an abnormality) is made again, the diagnostic apparatus does not turn on the warning light 23, that is, does not produce a warning, because it is considered that the relevancy between the two instances of abnormality detection is low. In this respect, too, it becomes possible to favorably reduce the incidence of an inappropriate or unnecessary warning caused by a temporary abnormality that does not have repeatability.

The diagnostic apparatus is able to more appropriately determine "the return of the internal combustion engine E to the normal state" because the return from the abnormal state to the normal state of the engine E is recognized on the condition that no excessive occurrence of misfires is detected during a period between a start and a stop of the engine, that is, during a trip.

The diagnostic apparatus is able to easily and reliably determine "whether an excessive occurrence of misfires is detected during a period between a start and a stop of the engine" simply through the flag processing performed while the engine is in operation, because the apparatus employs the detection history flag XU, which is set upon detection of an excessive occurrence of misfires and is kept set until the engine stops, and the normality history flag XX, which is cleared on the condition that the detection history flag XU has the setup status. Therefore, it becomes possible to easily determine whether the "return from the abnormal state to the normal state of the internal combustion engine E" is recognized.

Furthermore, the diagnostic apparatus is able to easily and reliably determine that "after the diagnosis of the presence of an abnormality is made, the return of the internal combustion engine E to the normal state is not recognized" merely through the flag processing performed while the engine is in operation, because the apparatus employs the abnormality history flag XC, which is set on the condition that the abnormality determination is made and which is cleared on the condition that the normality history flag XX has the setup status at the start of the engine.

Further, the diagnostic apparatus is able to easily and reliably determine that "after the diagnosis of the presence of an abnormality is made, the return of the internal combustion engine E to the normal state is not recognized after a restart of the engine E" merely through the flag processing performed while the engine is in operation, because the apparatus employs the previous abnormality flag XL, which is set at the start of operation of the engine on the condition that the abnormality history flag XC has the setup status at that time and which is kept set until the stop of the engine.

Still further, the diagnostic apparatus is able to easily and reliably turn on the warning light 23 on the condition that "after the first diagnosis of the presence of an abnormality, the second diagnosis of the presence of an abnormality is made without the return of the engine E to the normal state being recognized after a restart of the engine E" merely through the flag processing performed while the engine is in operation, because the apparatus adopts, as a condition for turning on the warning light 23, the condition that the diagnosis of the presence of an abnormality is made and, at that time, the previous abnormality flag XL has the setup status.

Further, the diagnostic apparatus is able to prevent an inappropriate diagnosis of the presence of an abnormality from being made in response to an operation error of the revolution speed sensor 17 or the like, a temporary increase in the occurrence of misfires, and the like, and is therefore able to perform more appropriate diagnostics, because the apparatus makes the diagnosis of the presence of an abnormality on the condition that the excessive occurrence of misfires is detected at least four times during an operation of the engine.

Further, it also becomes possible to more appropriately produce a necessary warning regarding the diagnostic of a misfire, the incidence of which considerably varies depending on external engine operation conditions, such as ambient air temperature, pressure conditions, and the like, because the aforementioned condition for turning on the warning light 23 is applied to the diagnostic apparatus for detecting an abnormality that is related to a misfire.

Furthermore, the above-described operations of the flags involved in the diagnostics can all be performed while the engine is in operation. Therefore, it becomes unnecessary to perform history update or the like after a stop of the engine. In addition, it becomes also unnecessary to provide devices for maintaining some of the functions of the diagnostic apparatus after the engine stops, for example, a main relay control circuit for continuing electrifying the electronic control unit 20 after the ignition switch is turned off.

Furthermore, the diagnostic apparatus prevents an undesired event that the warning light 23 continues to be on after an abnormality automatically disappears, because the apparatus is designed to turn off the warning light 23 in the case where after the warning light 23 is turned on, it is recognized that the diagnosis of the presence of an abnormality is not made again, more specifically, that the engine E is operated normally during three trips (not necessarily consecutive).

The above-described internal combustion engine diagnostic apparatus of the embodiment may be modified as follows.

Although in the foregoing embodiment, occurrence of a misfire is detected on the basis of fluctuations of the rotation speed of the crankshaft 15, this misfire detecting method is not restrictive. That is, a different detection method may also be employed to detect occurrence of a misfire.

Although the diagnostic apparatus of the foregoing embodiment determines the excessive occurrence of misfires based on the number of misfires that occur during 1,000 revolutions of the engine E, this method for determining the excessive occurrence of misfires is not restrictive.

Although the diagnostic apparatus of the foregoing embodiment produces a warning regarding an abnormality by turning on the warning light 23, this warning method is not restrictive, either. Various other warning methods, for example, methods that utilize display of characters or production of voices or sounds, may also be employed.

In the foregoing embodiment, once the warning is produced, the on-state of the warning light 23 is continued for warning until the apparatus subsequently experiences three trips (not necessarily consecutive) during which no excessive occurrence of misfires is detected and therefore the abnormality determination is not made. However, this condition for turning off the warning light 23, that is, for stopping warning, is not restrictive, either.

The conditions for the normality determination adopted in the foregoing embodiment are not restrictive, either. Instead of the aforementioned conditions (a1) and (a2), other conditions may be adopted for the normality determination.

The number of times of detecting the excessive occurrence of misfires (MFEX#≧4) adopted as the condition for the abnormality determination by the foregoing embodiment is not limited to "4" but may also be set to any other number.

Furthermore, although in the foregoing embodiment, the number of times of detecting the excessive occurrence of misfires is adopted as a criterion for the abnormality determination (i.e., a criterion for diagnosis of the presence of an abnormality), this condition for the abnormality determination is not restrictive. That is, a criterion other than the number of times of detecting the excessive occurrence of misfires may also be adopted for the abnormality determination.

Although the embodiment is described above in conjunction with the diagnostic apparatus for performing diagnostics regarding an excessive occurrence of misfires, which is merely one of the abnormalities that occur in an internal combustion engine, it is also possible to apply the invention to a diagnostic apparatus that performs diagnostics based on detection of occurrence of an abnormality other than a misfire, for example, errors in signals outputted by various sensors provided in various portions of an internal combustion engine, operation failures of various actuators, and the like, in a manner similar to that described above.

The foregoing embodiment recognizes that all the conditions for permitting production of a warning are met, based on the setup status of the previous abnormality flag XL and the diagnosis of the presence of an abnormality. However, the use of the previous abnormality flag XL is not restrictive. That is, it is also possible to permit production of a warning, without employing the previous abnormality flag XL, on the condition that "after the first diagnosis of the presence of an abnormality is made, the second diagnosis of the presence of an abnormality is made without the return of the internal combustion engine to the normal state being recognized after a restart of the engine", if it can be recognized, based on the content of the history of the abnormality history flag XC, that the condition that "after the diagnosis of the presence of an abnormality, the return of the internal combustion engine to the normal state is not recognized", which is one of the aforementioned conditions, is met and it can also be recognized, by a suitable method other than the previous abnormality flag XL, that "the presently made diagnosis of the presence of an abnormality is the second one that is made after a restart of the engine after the previous diagnosis was made".

Although in the foregoing embodiment, the "return to the normal state" of the engine E is recognized on the condition that "no excessive occurrence of misfires (no occurrence of an abnormality) is detected during an operation of the engine (trip)", the adoption of the condition for recognizing the "return to the normal state" is not restrictive, either. That is, this recognition may also be made by adopting a different condition.

Furthermore, various methods may be employed to recognize that "after the first diagnosis of the presence of an abnormality is made, the second diagnosis of the presence of an abnormality is made without the return of the engine to the normal state being recognized after a restart of the engine", that is, the condition for producing a warning regarding an abnormality. That is, regardless of the recognizing method employed to produce a warning regarding an abnormality, a diagnostic apparatus is able to more appropriately produce a necessary warning regarding an abnormality of an internal combustion engine as long as the diagnostic apparatus is an apparatus that produces a warning after recognizing that the aforementioned condition is met.

Further, the advantage of reducing the incidence of an unnecessary or inappropriate warning and therefore more appropriately producing a necessary warning regarding an abnormality can still be achieved to a certain extent if a warning is produced merely on the condition that "after the first diagnosis of the presence of an abnormality, the second diagnosis of the presence of an abnormality is made after a restart of an internal combustion engine", without recognizing the "return of the engine to the normal state" at all.

Although in the foregoing embodiment, information regarding various states of the engine E is stored in a software manner using the flags, it is also possible to store information regarding various states of the engine E in a hardware manner using a logic circuit.

While the present invention has been described with reference to what is presently considered to be a preferred embodiment thereof, it is to be understood that the present invention is not limited to the disclosed embodiment or constructions. On the contrary, the present invention is intended to cover various modifications and equivalent arrangements.

What is claimed is:

1. A diagnostic apparatus for an internal combustion engine, comprising:
    diagnostic means for diagnosing whether an abnormality is present in the engine; and
    condition management means for permitting execution of a warning indicating an abnormality of the engine, when a first diagnosis of the abnormality has been made by the diagnostic means and a second diagnosis of the presence of the abnormality is made by the diagnostic means after a restart of the engine.

2. A diagnostic apparatus for an internal combustion engine according to claim 1, wherein the condition management means includes recovery recognizing means for recognizing whether the engine has returned to a normal state, and wherein the condition management means permits the execution of the warning when the second diagnosis of the presence of an abnormality is made by the diagnostic means without a return to the normal state being recognized by the recovery recognizing means after the restart of the engine.

3. A diagnostic apparatus for an internal combustion engine according to claim 2, wherein the diagnostic means includes detection means for detecting abnormalities of the engine, and determination means for making an abnormality determination regarding the engine when a result of detection by the detection means meets a predetermined condition, and wherein the recovery recognizing means recognizes the return of the engine to the normal state when the occurrence of an abnormality is not detected by the detection means during a period between a start of the engine and a stop of the engine.

4. A diagnostic apparatus for an internal combustion engine according to claim 3, wherein the recovery recognizing means includes first history retaining means for retaining until the engine stops a history of abnormalities detected by the detection means, and second history retaining means for retaining, even after the engine stops, a history indicating that the engine is in the normal state, on a condition that the first history retaining means includes no record of a detected abnormality, and wherein the recovery recognizing means recognizes the return to the normal state based on a content of the history retained by the second history retaining means.

5. A diagnostic apparatus for an internal combustion engine according to claim 3, wherein the detection means detects an excessive occurrence of misfires in the engine, and wherein the diagnostic means diagnoses the presence of an abnormality of the engine when a number of detected excessive occurrences of misfire at least a predetermined number.

6. A diagnostic apparatus for an internal combustion engine according to claim 2, wherein the condition management means includes abnormality diagnosis history retaining means for retaining a history of diagnoses of abnormality made by the diagnostic means even after the engine stops and wherein the history of diagnoses retained by the abnormality diagnosis history retaining means is deleted when the return to the normal state is recognized by the recovery recognizing means, and wherein the condition management means determines whether the engine has returned to the normal state, and determines whether the diagnosis of the presence of an abnormality has been made by the diagnostic means based on the history retained by the abnormality diagnosis history retaining means.

7. A diagnostic apparatus for an internal combustion engine according to claim 6, wherein the condition management means further includes temporary retaining means for separately retaining, when the history of diagnosis of an abnormality is retained by the abnormality diagnosis history retaining means at a start of the engine, the history of diagnoses of abnormalities until the engine stops, and wherein the condition management means determines that the engine has not returned to the normal state since a restart of the engine, based on a content of the history retained by the temporary retaining means.

8. A diagnostic apparatus for an internal combustion engine according to claim 7, wherein the condition management means permits the execution of the warning when the diagnosis of the presence of an abnormality is made by the diagnostic means when diagnosis of an abnormality is retained in the temporary retaining means.

9. A diagnostic apparatus for an internal combustion engine according to claim 6, wherein the detection means detects an excessive occurrence of misfires in the engine, and wherein the diagnostic means diagnoses the presence of an abnormality of the engine when a number excessive occurrence of misfires detected by the detection means is at least a predetermined number.

10. A diagnostic apparatus for an internal combustion engine according to claim 2, wherein the condition management means stops the execution of the warning when the return of the engine to the normal state is recognized by the recovery recognizing means consecutively at least a predetermined number of times during the execution of the warning.

* * * * *